United States Patent
Rigolone et al.

(10) Patent No.: US 8,915,694 B2
(45) Date of Patent: Dec. 23, 2014

(54) LOADING DEVICES FOR LOADING BARS FOR MACHINING IN MACHINE TOOLS

(75) Inventors: Franco Rigolone, Ponteranica (IT); Renato Rota, Carvico (IT)

(73) Assignee: Gildemeister Aktiengesellschaft, Bielefeld (DE)

( * ) Notice: Subject to any disclaimer, the term of this patent is extended or adjusted under 35 U.S.C. 154(b) by 316 days.

(21) Appl. No.: 13/044,292

(22) Filed: Mar. 9, 2011

(65) Prior Publication Data

US 2011/0274520 A1 Nov. 10, 2011

(30) Foreign Application Priority Data

Mar. 11, 2010 (DE) .......................... 10 2010 002 781

(51) Int. Cl.
| | |
|---|---|
| *B23B 13/02* | (2006.01) |
| *B23Q 7/12* | (2006.01) |
| *B23B 13/10* | (2006.01) |
| *B23Q 7/00* | (2006.01) |
| *B23Q 7/08* | (2006.01) |

(52) U.S. Cl.
CPC ............. *B23Q 7/001* (2013.01); *B23B 13/02* (2013.01); *B23Q 7/12* (2013.01); *B23B 13/10* (2013.01); *B23Q 7/08* (2013.01)
USPC .................................... 414/745.9; 414/746.1

(58) Field of Classification Search
USPC ............ 198/725, 728, 775; 221/298; 408/69; 414/14, 15, 22.62, 22.68, 745.1–745.9, 414/746.1–746.6, 746.8; 451/335; 82/125–127
See application file for complete search history.

(56) References Cited

U.S. PATENT DOCUMENTS

| | | | | |
|---|---|---|---|---|
| 3,232,449 A | * | 2/1966 | Quin ........................... | 414/746.1 |
| 3,406,838 A | * | 10/1968 | Davidson ................... | 414/746.1 |
| 3,618,741 A | | 11/1971 | Berndt | |
| 3,623,600 A | * | 11/1971 | Dell .............................. | 198/751 |
| 3,708,053 A | * | 1/1973 | Anderson ..................... | 198/445 |

(Continued)

FOREIGN PATENT DOCUMENTS

| | | |
|---|---|---|
| DE | 223103 | 6/1985 |
| EP | 0587248 | 3/1994 |

(Continued)

OTHER PUBLICATIONS

European Patent Office, "Extended European Search Report," issued in connection with EP Application No. 11157156.8, dated Jun. 1, 2011, (7 pages).

(Continued)

*Primary Examiner* — Gregory Adams
(74) *Attorney, Agent, or Firm* — Hanley, Flight & Zimmerman, LLC

(57) ABSTRACT

Disclosed examples relate to loading devices for loading bars for machining in machine tools. A disclosed example loading device is adapted to move a bar from a starting position to an end position and to feed the bar from the end position to the machine tool, comprising a rest portion for supplying the loading device with at least one bar lying on the rest portion in the starting position, and a movable transport for transporting the bar from the starting position to the end position. The transport is adapted to transport the bar downward in a downward movement due to its gravity along a downwardly inclined guiding portion, the bar being supported by a first support portion of the transport.

9 Claims, 11 Drawing Sheets

(56) References Cited

U.S. PATENT DOCUMENTS

| | | | | |
|---|---|---|---|---|
| 3,985,221 | A | * | 10/1976 | Lueders ................. 198/463.5 |
| 4,102,449 | A | * | 7/1978 | Shufran ................. 198/774.4 |
| 4,321,995 | A | * | 3/1982 | Dell et al. ............... 198/459.1 |
| 4,383,604 | A | * | 5/1983 | Grandemange ............ 198/775 |
| 4,574,942 | A | * | 3/1986 | Gordon .................... 198/773 |
| 4,586,253 | A | * | 5/1986 | Souchi et al. ............... 29/796 |
| 4,658,954 | A | * | 4/1987 | Harlow ................. 198/774.1 |
| 4,936,736 | A | * | 6/1990 | Meier ..................... 414/746.1 |
| 5,366,334 | A | | 11/1994 | Cucchi |
| 5,374,157 | A | * | 12/1994 | Allard ..................... 414/746.6 |
| 5,653,570 | A | * | 8/1997 | Weirathmueller ......... 414/746.6 |
| 6,035,502 | A | * | 3/2000 | Lussier et al. ............... 29/33 T |
| 6,199,461 | B1 | * | 3/2001 | Geiser ......................... 82/124 |
| 6,272,955 | B1 | | 8/2001 | Scemama |

FOREIGN PATENT DOCUMENTS

| | | | |
|---|---|---|---|
| EP | 1029619 | | 11/2004 |
| JP | 2007276102 | | 10/2007 |
| JP | 2007276102 A | * | 10/2007 |
| JP | 2010036307 A | * | 2/2010 |

OTHER PUBLICATIONS

State Intellectual Property Office of People's Republic of China, "First Office Action," issued in connection with Chinese Patent Application No. 201110058661.6, on Mar. 4, 2014 (10 pages).

* cited by examiner

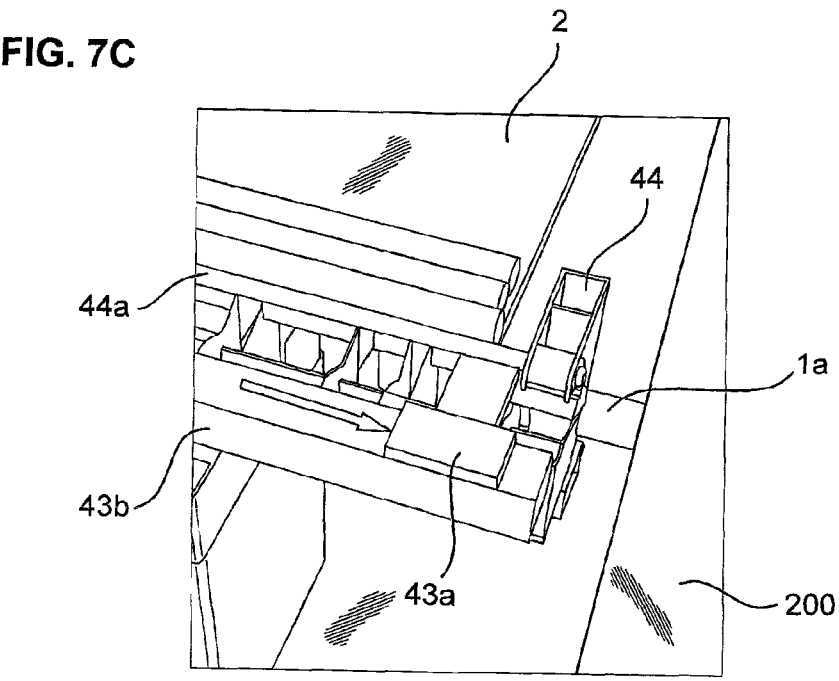
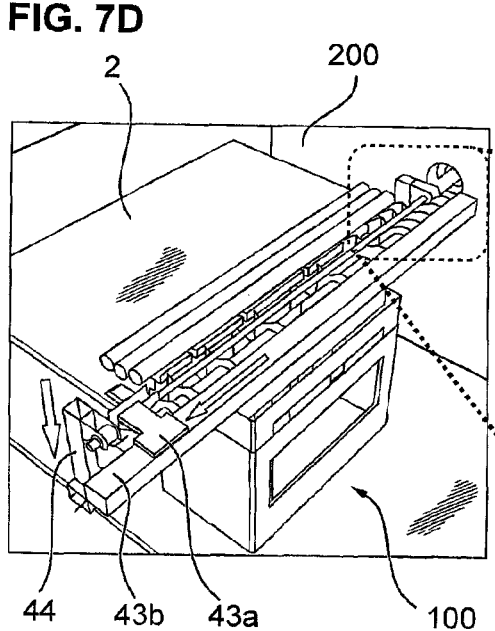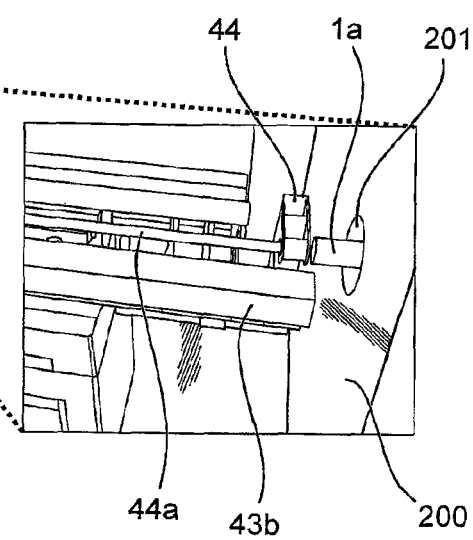

LOADING DEVICES FOR LOADING BARS FOR MACHINING IN MACHINE TOOLS

RELATED APPLICATIONS

This patent claims priority to German Patent Application No. 10 2010 002 781.2, filed on Mar. 11, 2010, which is hereby incorporated by reference herein in its entirety.

FIELD OF THE DISCLOSURE

The present disclosure relates generally to loading devices and, more particularly, to loading devices for loading bars for machining in machine tools.

BACKGROUND

Loading devices are known in the prior art and used to feed bars to a machine tool. Such machine tools comprise, for example, turning lathes, automatic lathes, turning centers or the like machines for machining bars. EP 0 587 248 A1, for example, shows a loading device for loading bars for machining in a machine tool wherein a bar is first moved from a starting position to an end position and then the bar is fed to the machine tool by starting from the end position in an axial direction. Here, the end position is aligned coaxially with a feeding position in which the bar is to be fed to the machine tool in an axial direction, for example, coaxially with a spindle for receiving the bar to be machined.

FIG. 8A shows a schematic perspective view of the elements relevant for the loading cycle of the loading device of EP 0 587 248 A1, that is, of the relevant elements for the transport of a bar from the starting position to the end position. FIG. 8B shows a schematic side view of the relevant elements for the loading cycle according to the teaching of EP 0 587 248 A1.

The loading device for loading bars for machining in a machine tool according to EP 0 587 248 A1 shows two sliding chutes 16 arranged in parallel in an axial direction of the bar, to which a respective L-shaped holding element 17 is fastened. The sliding chutes 16 are inclined downwardly so that a bar arranged on the sliding chutes 16 rolls down due to its gravity until it is stopped by the holding elements 17 in a holding position. Here, FIG. 8A exemplarily shows a bar 15 in the holding position. This holding position on the sliding chutes 16 corresponds to a starting position of the loading cycle of the loading device. Furthermore, the device comprises two lifting elements 22 also arranged in parallel in an axial direction of the bar, which are used for transporting the bar from the starting position to the end position on the sliding chutes 16. Here, the end position of the bar can be seen by means of the bar 13 in FIG. 8A. For holding a bar in the end position, the loading device of EP 0 587 248 A1 comprises two guiding elements 20 realized semi-circularly in profile and forming an accommodation for a bar 13 on the surface thereof, which bar can be held in the end position. The bar 13 lying in the guiding elements 20 is fed from the end position to the machine tool in an axial direction.

The loading cycle and the transport, respectively, of a bar 13 from the starting position on the sliding chutes 16 to the end position in the guiding elements 20 is schematically shown in FIG. 8B. FIG. 8B shows how a plurality of bars is arranged on the sliding chute and held one behind the other for supply by the holding element 17. The bar 15, which in this case is directly in contact with the holding elements 17, is held in the starting position by the holding elements 17 on the sliding chutes 16. According to the teaching of EP 0 587 248 A1, each of the lifting elements 22 can be moved up and down and is moved to a low position at the beginning of the loading cycle, which is below the bar 15 held in the starting position. Each lifting element 22 comprises a downwardly inclined surface 23 which is joined by a holding portion formed by an upwardly inclined surface 24 at a point 26 that later defines a holding position of the bar in the lifting element 22.

For taking the bar 15 out of the starting position, the lifting elements 22 are vertically moved up until the surfaces 23 come into contact with the bar in the starting position. When the upward movement of the lifting elements 22 is continued, the bar is taken off the sliding chutes 16 in the upward movement out of the starting position and pushed upward along the surface of the upwardly inclined holding elements 17, the bar being supported and pushed upward, respectively, in the upward movement by the surface 23 of the lifting element 22.

The dashed line in FIG. 8B illustrates the position of the lifting elements 22 in a topmost position after the vertical upward movement. Here, the bar 13' supported by the surface 23 is released from contact with the holding elements 17 and consequently rolls down the downwardly inclined surface 23 of the lifting elements 22 due to its gravity until it abuts the holding area 24 and is then held in the holding position 26, as is shown by the bar having reference numeral 13''.

In a subsequent step, the lifting elements 22 are moved vertically down until the bar is deposited in the round reception portion of the guiding elements 20 in the end position (see the position of the bar in FIG. 8B). Then the bar is fed to the machine tool from this position in an axial direction. The lifting elements 22 move further down vertically and then are ready to transport a next bar from the starting position to the end position in a subsequent upward movement in a further loading cycle.

Although the loading cycle according to EP 0 587 248 A1 provides a simple system for transporting the bar from the starting position to the end position because only one upward movement and one downward movement following thereupon of the lifting element 22 is required to perform the transport from the starting position to the end position. However, the major disadvantage occurs that the bar to be transported, after it has been released from contact with the holding elements 17 in the upward movement of the lifting elements 22, rolls down the downwardly inclined surface 23 due to its gravity and collides with the holding area 24 of the lifting elements 22.

Due to the impact occurring after the roll-down movement of the bar on the surface 23 of the lifting element 22, the major disadvantage results in that the entire loading device coupled to the machine tool is exposed to an impact or a shock which, in addition thereto, is also passed on to the machine tool. Thereby, the machining operations on the machine tool are affected in a negative way. In case of a long-term use of the loading device, it is by all means possible in this case that parts of the loading device or the machine tool will be damaged. Furthermore, such impacts during the loading cycle generate an extremely loud noise when the impact occurs. However, according to FIG. 8B, the further disadvantage results in that the size of the holding area 24 limits the cross-section of the loadable bars because bars having a larger cross-section may be conveyed beyond the holding area 24 after rolling down because of the impulse occurring in the roll-down movement. Furthermore, due to the required roll-down movement of the bar on the surface 23 of the lifting element 22, it is merely possible to transport those bars having a circular cross-section which are suitable for rolling down by means of the device according to the teaching of EP 0 587 248 A1 to the end position. Bars having a cross-section deviating in shape from a circular cross-section, in particular those having an angular cross-section, however, cannot be transported.

With regard to the above-described disadvantages of a loading device according to the teaching of EP 0 587 248 A1, a loading device for loading bars for machining in a machine tool was provided, for example, in EP 1 029 619 A1 which develops a loading device according to EP 0 587 248 A1 such that a low-impact or low-noise loading process during the transport of a bar form the starting position to the end position is accomplished. Here, EP 1 029 619 A1 in particular describes a loading device which also comprises downwardly inclined sliding chutes for supplying bars, wherein a bar disposed on the sliding chutes is held by retaining fingers in a starting position. In this case, the retaining fingers are upwardly inclined.

In analogy to the teaching of EP 0 587 248 A1 the loading device of EP 1 029 619 A1 also comprises a lifting element that can be moved up and down and which receives a bar from the sliding chutes from the starting position and pushes it upward along a surface of the upwardly inclined retaining fingers in analogy to the above-described loading device. However, according to the teaching of EP 1 029 619 A1, in difference to the above-described loading device, a receiving portion of the lifting element is simultaneously used as a holding portion for holding the bar in the end position. Consequently, the moment the bar loses contact with the retaining finger, the bar is received in the receiving portion of the lifting element and then is moved up to the end position only by further moving the lifting element upward, which end position is coaxially aligned with the feeding position in which the bar is axially fed to the machine tool.

In this case, however, the loading device according to the teaching of EP 1 029 619 A1 has the major disadvantage that the device can only be adapted by means of a complicated mechanism to bars of different bar cross-sections. On the one hand, the topmost position must be adapted to the bar cross-section after the upward movement of the lifting element, that is, a bar having a smaller cross-section must be moved to a higher position of the lifting element than a bar having a larger cross-section because it is necessary to coaxially align the center of the bar cross-section in the end position to the feeding position of the machine tool. Additionally, however, it is also required to adapt the angle of inclination and the shape of the retaining fingers, respectively, in dependence of the bar cross-section by means of a complicated mechanism. Here, the topmost position of the lifting element must be adjusted after the upward movement so as to be synchronous with the adapted angle of inclination of the retaining finger.

BRIEF DESCRIPTION OF THE DRAWINGS

FIGS. 7A to 7H exemplarily show a loading cycle of a bar to the machine tool of FIG. 6, in which the bar is fed to the machine tool from an end position in an axial direction.

DETAILED DESCRIPTION

Figure 1A:
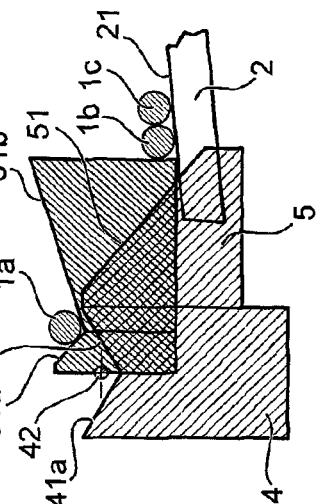
FIGS. 1A to 1E schematically show a loading cycle of the loading process on a loading device according to some preferred example embodiments.

In the following, disclosed example embodiments are described in detail with reference to the attached Figures. However, the scope of coverage of this patent is not limited to the example embodiments described herein. To the contrary, this patent covers all methods, apparatus, systems, and articles of manufacture fairly falling within the scope of the appended claims either literally or under the doctrine of equivalents. In the Figures, same or similar features of the disclosed examples are denoted by the same reference numerals.

Example loading devices are disclosed for loading bars for machining in machine tools. An example loading device is adapted to move a bar from a starting position to an end position and to feed the bar from the end position to the machine tool, comprising a rest portion for supplying the loading device with at least one bar lying on the rest portion in the starting position, and movable transport means for transporting the bar from the starting position to the end position.

In addition, example systems are disclosed for loading bars for machining in a machine tool. An example system comprises a machine tool for machining a bar and a loading device for loading bars for machining in the machine tool, wherein the loading device is adapted to move a bar from a starting position to an end position and to feed the bar from the end position to the machine tool, including a rest portion for supplying the loading device with at least one bar lying on the rest support in the starting position, and movable transport means for transporting the bar from the starting position to the end position.

Examples disclosed herein provide a loading device for loading bars for machining in a machine tool in which the transport of a bar from a starting position to an end position is performed quickly, with low impact, without shocks, without noise and in a particularly simple manner, wherein the loading device is furthermore suitable in a simple manner for loading bars having different cross-sectional sizes and cross-sectional shapes and may be adapted in a simple manner to the loading of bars having different cross-sectional sizes so that it will be possible in a particularly simple fashion and without complicated adjusting or adapting mechanisms to use the loading device for feeding both bars having a larger and a smaller cross-section to the machine tool.

Example loading devices for loading bars for machining in machine tools are disclosed. An example loading device is adapted to move a bar from a starting position to an end position and to feed the bar from the end position to the machine tool. The loading device comprises a rest portion for supplying the loading device with at least one bar which lies on the rest portion in the starting position, and movable transport means for transporting the bar from the starting position to the end position. In some examples, the transport means is adapted to transport the bar downward in a downward movement due to its gravity along a downwardly inclined guiding portion, the bar being supported by a first support portion of the transport means.

In some examples, the bar is moved from a starting position to the end position by using a transport means which is adapted such that during a downward movement of the transport means the bar is transported due to its gravity along a downwardly inclined guiding portion and simultaneously supported by a support portion of the transport means.

In particular, this makes it possible in an advantageous manner to move the bar in the direction of the end position in a simple downward movement without the bar rolling down a downwardly inclined portion and impacting a holding element. Thus, examples disclosed herein make it particularly possible to carry out a loading cycle quickly and with low impact or even without an impact because in a downward movement the bar does not roll down along a downwardly inclined guiding plane or guiding portion but is moved in a supported manner and guided downward, respectively. If there is no impact of a bar rolling down on a holding element, it is possible in this way to transport also heavy large bars of a large bar cross-section with low impact and in a guided manner in the downward movement to the end position.

The term "bars" as used herein comprises, but is not limited to, bars having a round, in particular circular cross-section. However, the term "bars" is not limited to such bars but further comprises elongated objects of any cross-section, optionally also of a cross-section changing in a longitudinal direction, that are fed to a machine tool for machining. In particular, elongated objects having hollow cross-sections are comprised of, for example tubes or pipes. The term of an elongated object in this case refers to an object the length of which exceeds the diameter or the dimensions of the cross-section. Furthermore, examples disclosed herein make it possible in an advantageous manner to transport bars having an angular cross-sectional shape because it is not necessary according to examples disclosed herein that the bar roll down an inclined surface during the loading cycle as is taught in the prior art. The bars may have, e.g., hexagonal cross-sectional shapes.

In some preferred examples, the transport means is further adapted to lift the bar from the rest portion in an upward movement and to push the bar upward along an upwardly inclined guiding portion, the bar preferably being supported by a second support portion of the transport means. This makes it possible in an advantageous manner to transport the bar in an upward movement and a subsequent downward movement from the starting position to the end position, wherein the bar can be lifted in the upward movement from an inclined rest support or a portion of a bar magazine in a particularly simple manner.

In some preferred examples, during the transport from the starting position to the end position, the bar is supported in a topmost position by the first and the second support portions of the transport means. This advantageously enables the bar to be supported at the topmost position during transport from the starting position to the end position both by the first and the second support portion of the transport means, the first and the second support portion preferably being oppositely inclined so that the bar can be held in a rest position between the first and the second support portions in a defined position. This is particularly advantageous if the transport means performs a transport movement in which the bar is held only by elements of the movable transport means or is in contact only with elements of the transport means, for example, if after an upward movement along an upwardly inclined guiding portion it loses contact with the guiding portion and might carry out a rolling movement without the supporting guidance by the first and second support portions due to its gravity, which rolling movement would again lead to an impact. A further advantage results in that the bar at the topmost position has a defined rest position supported by the first and the second support portions during the transport from the starting position to the end position. This is particularly advantageous in case of embodiments in which additionally to the upward and downward movements of the transport means a lateral transport movement of the bar is provided by using the transport means.

In some preferred examples, the transport means comprises a transport element including a first angular portion, wherein a first leg of the angle preferably forms the first support portion and a second leg of the angle of the first angular portion preferably forms the second support portion. Particularly, this offers the advantage that the angular portion defines a position of the bar in a particularly simple manner if it is supported and held, respectively, by the first and the second support portion. Furthermore, the angular portion on the transport element makes it possible to realize two oppositely inclined support portions in one element in a simple manner. Here, the angular portion may preferably be realized in a V-shape, wherein it is furthermore possible to form the portion between the first and the second support portions by a curvature. In this case, angular not only relates to shapes in which an upwardly and a downwardly inclined portion intersect each other linearly at an angle, rather, it is furthermore possible that the first and/or the second support portion(s) has an upwardly or downwardly running arcuate surface that meet at a V-shape or an angle.

In some preferred examples, the transport means can be moved up and down, in particular vertically up and down. This offers the advantage that a particularly simple transport mechanism can be provided in which the transport means can in particular be moved up and down. This makes it possible to provide loading devices in which a loading process according to examples disclosed herein is executed by merely one upward and one downward movement without a lateral transport movement occurring in between. Thus, it is possible to perform a fast and efficient loading cycle of moving the bar from the starting position to the end position.

In some preferred examples, the rest portion is a downwardly inclined rest portion on which the bar lying in the starting position is preferably retained by a retaining element against its gravity. This makes it possible to realize or form a bar supply means, for example a bar magazine, in a particularly simple manner, wherein the bar lying in the starting position rests on the downwardly inclined rest portion and is retained by the retaining element against its gravity and can thus be held precisely in the starting portion from where the transport means receives the bar for transport to the end position.

In some preferred examples, the retaining element comprises the upwardly inclined guiding portion. This makes a particularly simple construction of an example loading device as disclosed herein possible because the retaining element has the upwardly inclined guiding portion, the guiding portion being preferably formed integrally with the retaining element.

In some preferred examples, the loading device furthermore comprises feeding means adapted to feed the bar from the end position of the machine tool, the feeding means preferably including a feeding member having a receiving portion in which the bar lies in the end position. This makes it possible to feed the bar of the machine tool from the end position, in particular in an axial direction similarly to the prior art so that the machine tool does not have to be specially or specifically adapted to the mode of operation of the loading devices but may accommodate bars axially fed in the usual manner. Here, the end position is aligned particularly preferably with the feeding position, that is, coaxially aligned with the latter, optionally coaxially with a spindle of the machine tool where the bar can be accommodated for machining.

In some preferred examples, the feeding element comprises the downwardly inclined guiding portion. This makes a particularly simple construction of the loading device according to examples disclosed herein possible because the downwardly inclined guiding portion, along which the bar is guided in the downward movement due to its gravity and supported by a support portion, may be formed integrally with the feeding element. According to examples disclosed herein, this enables a direct transport of the bar from the disclosed downward movement along the downwardly inclined guiding plane and the downwardly inclined guiding portion, respectively, towards the end position which is preferably realized in the feeding element.

In some preferred examples, the feeding element comprises a second angular portion, one leg of the angle of the second angular portion preferably forming the downwardly inclined guiding portion. This makes a particularly simple construction of a receiving portion possible for receiving the bar in the end position if the feeding element has an angular portion, wherein an example downwardly inclined guiding plane and a downwardly inclined guiding portion, respectively, can also be provided in a particularly simple manner because the latter can be realized by a leg of the angle of the angular portion of the feeding element. According to some preferred examples, the angular portion is realized in a V-shape. Here, the end position of the bar may be defined by the two legs of the angular portion on the feeding element in a particularly simple manner.

In some preferred examples, the feeding means is adapted to align the end position of the bar with a feeding position from which the bar is to be fed to the machine tool. This makes it possible in a particularly favorable manner to use the loading device for loading bars of different cross-sections because the bars can be aligned axially with a feeding position and coaxially with a feeding position, respectively, for feeding to the machine tool by coaxially aligning or centering the end position of the bars predetermined by the feeding means with the feeding position.

In some preferred examples, the feeding member can be moved up and down, in particular vertically up and down, for aligning the end position of the bar. This makes it possible in a particularly simple manner to align the end position of the bar predetermined by the feeding element in a vertical direction by moving the feeding element up and down so that the end position of the bar is coaxially aligned with the feeding position in dependence of the cross-section of the bar. When the end position of the bar is vertically aligned so as to be coaxial with the feeding portion, it is possible to provide a particularly simple aligning mechanism so that the loading device may be adapted to bars of different cross-sections in a particularly simple manner.

In some preferred examples, the feeding member comprises the upwardly inclined guiding portion. This makes a particularly simple construction possible in which the upwardly inclined guiding portion in examples disclosed herein may be realized with an upward movement during the transport of the bar, optionally in a directly integral manner with the feeding element. In some preferred examples, the feeding element has both the upwardly inclined guiding portion and the downwardly inclined guiding portion so that the guiding portions and the receiving portion for receiving the bar in the end position may be incorporated in one element which may function additionally as a retaining element when the upwardly inclined guiding portion is further used as a holding portion which holds the bars lying on the downwardly inclined rest portion against their gravity in the starting position.

The different portions described above, for example, rest portions, receiving portions, support portions or guiding portions, may be provided by individual pieces or composed elements. Furthermore, the portions may be joined into elements or the portions may be provided integrally in a monolithic element. This particularly applies to the first and second support portions. Furthermore, this applies to the first guiding portion, the second guiding portion and/or the rest portion.

Example systems are disclosed herein which comprise machine tools for machining bars and loading devices for loading bars for machining in the machine tools according to one or more of the above-described aspects.

FIG. 1A to FIG. 1E schematically show a loading cycle of the loading process on a loading device for loading bars for machining in a machine tool according to a disclosed example embodiment.

The loading device is adapted to transport a bar $1a$ from a starting position to an end position 42 and to feed the bar $1a$ from the end position 42 to the machine tool. Here, the feeding of the bar $1a$ from the end position into the machine tool for machining is performed in an axial direction of the bar $1a$, that is, perpendicularly to the drawing plane in FIGS. 1A to 1E (see, for example, FIGS. 7A to 7H).

As shown in FIG. 1A, for example, the loading device in the present embodiment comprises a bearing element 2 having a downwardly inclined rest portion 21, a retaining element 5 having an upwardly inclined guiding portion 51, a transport element 3 of a transport means with a first support portion $31a$ and a second support portion $31b$ and a feeding element 4 having an upwardly inclined portion $41a$ and a downwardly inclined guiding portion $41b$.

The bearing element 2 has the downwardly inclined rest portion 21 for supplying the loading device with a plurality of bars $1a$ to $1c$ lying on the downwardly inclined rest portion 21. In this case, a bar $1a$ lies in the starting position on the rest portion 21. The bar $1a$ lying in the starting position and the other bars $1b$ and $1c$ are retained against their gravity by the retaining element 5. The retaining element 5 has the upwardly inclined guiding portion 51. Here, the bar $1a$ in the starting position is in contact with the upwardly inclined guiding portion 51 of the retaining element 5 on the one hand, and in contact with the downwardly inclined rest portion 21 of the bearing element 2 on the other hand.

The transport means comprises a transport element 3, which can be vertically moved up and down, for transporting the bar $1a$ from the starting position to the end position 42. The transport element 3 has a first angular portion, a first leg of the angle forming the first support portion $31a$ and a second leg of the angle of the first angular portion forming the second support portion $31b$.

Figure 1B:
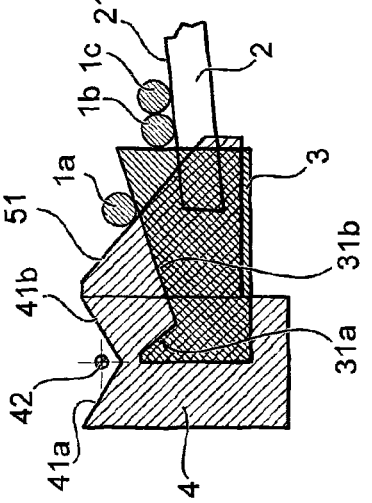

FIG. 1B shows the loading device at a point in time of moving the transport element 3 up. Here, the bar $1a$ was lifted from the rest portion 21 between the points in time of FIGS. 1A and 1B in an upward movement by the second support portion $31b$ of the transport element $3a$. The bar $1a$ is pushed upward along the upwardly inclined guiding portion 51 of the retaining element while being supported by the second support portion $31b$ of the transport element 3.

Figure 1C:
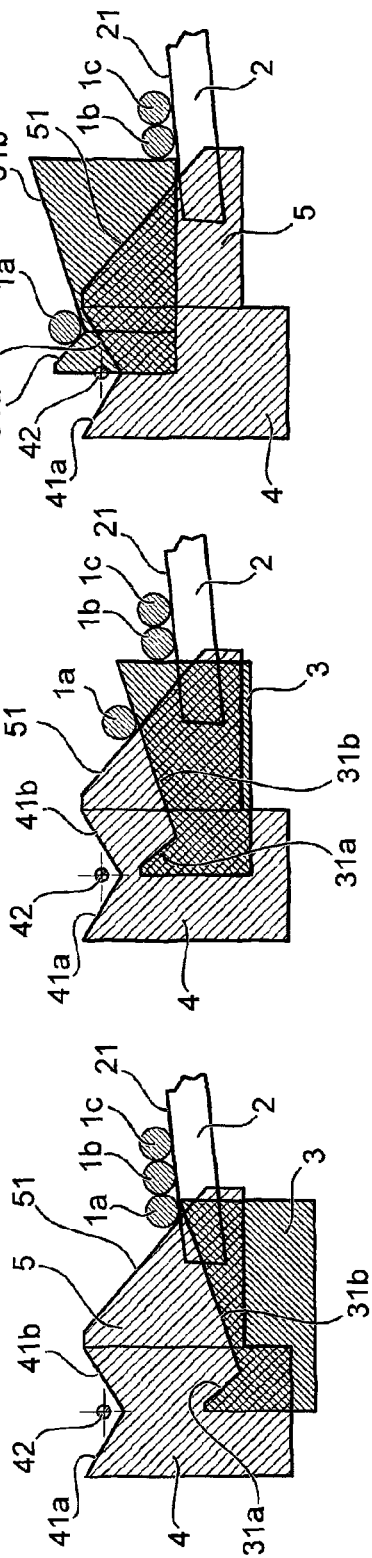

FIG. 1C shows the loading device at a point in time when the transport element 3 finishes the upward movement and is at a topmost position between the upward and the downward movement. The bar 1a is supported at the topmost position by the first and the second support portions 31a, 31b of the transport element 3 during transport from the starting position to the end position 42 and is thus in contact with both the first support portion 31a and the second support portion 31b.

Figure 1D:
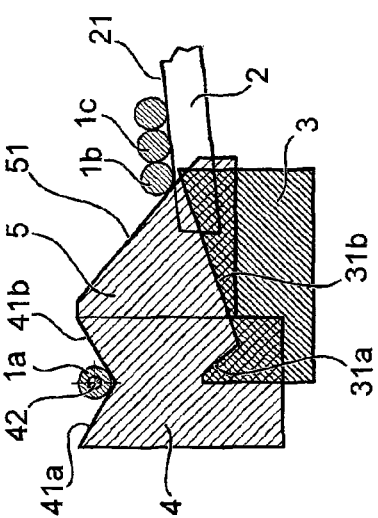

FIG. 1D shows the loading device at a point in time of the downward movement of the transport element 3. The bar 1a is moved downward due to its gravity along a downwardly inclined guiding portion 41b of the feeding element 3, the bar (1a) being supported by a first support portion (31a) of the transport means (3).

Figure 1E:
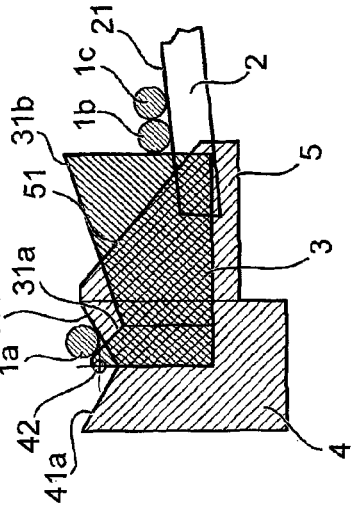

FIG. 1E shows the loading device at a point in time, when the transport of the bar 1a from the starting position to the end position is already completed and the bar 1a is lying in the end position 42. The loading device has the feeding means (further elements of the feeding means apart from the feeding element are not shown in FIG. 1A to FIG. 1E) which is adapted to axially feed the bar 1 from the position in the end position 42 to the machine tool. The feeding means comprises the feeding element 4 including the receiving portion in which the bar 1a lies in the end position 42. The receiving portion of the feeding element 4 is realized in this case by a second angular portion, one leg of the angle of the second angular portion forming the downwardly inclined guiding portion 41b.

Figure 2:
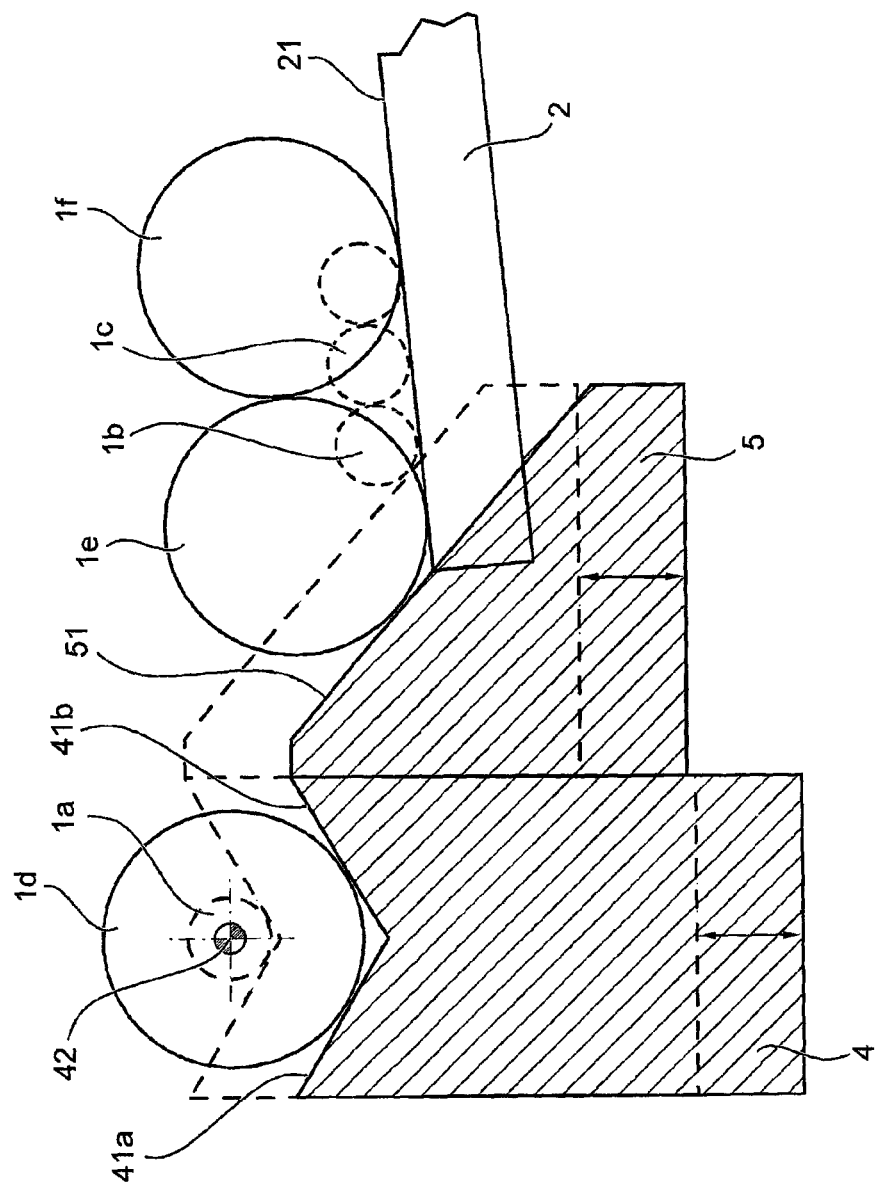
FIG. 2 schematically illustrates the aligning of an end position with a feeding position using feeding means of a loading device according to some preferred example embodiments in connection with a bar cross-section.

FIG. 2 schematically illustrates the coaxial alignment or centering of an end position with a feeding position by using feeding means of a loading device according to some preferred example embodiments in connection with a bar cross-section. Furthermore, the loading device is adapted to feed bars of different cross-sections to the machine tool. In this course, the machine tool is to be fed a bar axially in the same feeding position of the machine tool and independently of the cross-sectional area, that is, both a central axis of a bar having a smaller cross-section and a central axis of a bar having a larger cross-section must be positioned coaxially with a feeding position. This is schematically shown in FIG. 2 for a bar 1a having a smaller cross-section and a bar 1d having a larger cross-section, both bars 1a and 1d lying in the respective oriented end position aligned with the feeding position and centered with the feeding position, respectively. Here, the position of the bar is defined by the center point of the bar cross-section, the center of the bar cross-section being axially centered with the feeding position in the end position of the bar.

As schematically shown in FIG. 2, the feeding means of the loading device is adapted to align the end position 42 of the bar 1a or 1d in dependence of the respective bar cross-section with the feeding position from which the bar 1a is to be fed to the machine tool, the feeding element 4 being vertically movable up and down for aligning the end position 42 of the bar 1a.

Figure 3:
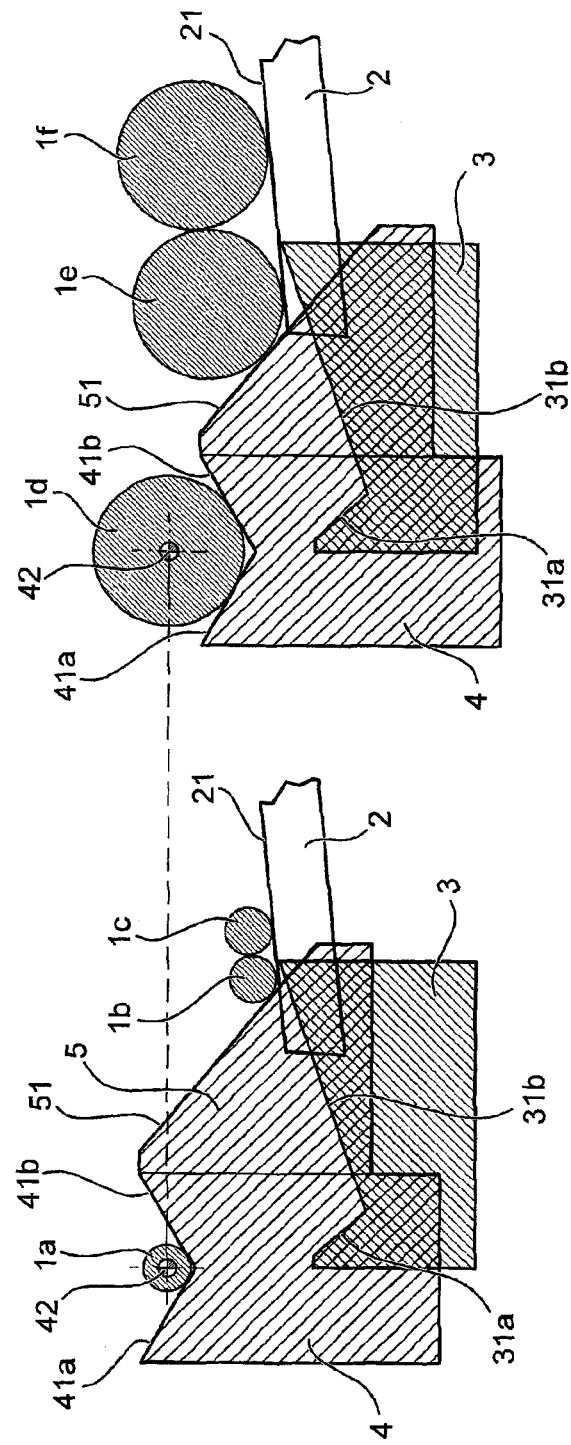
FIG. 3A schematically shows a loading device according to some preferred example embodiments in which an end position is aligned with a feeding position for bars of a large bar cross-section, and FIG. 3B schematically shows a loading device according to the example preferred embodiments in which an end position is aligned with a feeding position for bars of a large bar cross-section.

FIG. 3A schematically shows a loading device according to some preferred example embodiments in which an end position is aligned with a feeding position for bars of a large bar cross-section and FIG. 3B schematically shows a loading device according to the example preferred embodiments with which an end position is aligned with a feeding position for bars having a large bar cross-section. In this case, the bar 1a in the end position in FIG. 3A has a smaller cross-section than the bar 1d in the end position in FIG. 3B. The feeding element 4 is positioned lower with the retaining element 5 in FIG. 3B than the feeding element 4 in FIG. 3A in order to align and to center the bar 1d having the larger cross-section in the end position with the feeding position. Here, the feeding element 4 is displaced downward in a vertical direction with the retaining element 5 in FIG. 3B as compared to the arrangement in FIG. 3A. FIGS. 3A and 3B show that the inclined rest position 21 is suitable for supplying bars of the smaller diameter (see FIG. 3A) as well as bars of the larger diameter (see FIG. 3B) in a starting position without requiring a re-alignment. The arrangement of the transport element 3 and the bearing element 2 relative to one another is the same in FIG. 3A and FIG. 3B.

Above, preferred example embodiments based on examples disclosed herein has been described by referring to FIGS. 1A to 3B. In this course, reference was respectively made to a bearing element 2, a transport element 3, a retaining element 5 and a feeding element 4. In the above described embodiment, the bearing element 2, the transport element 3 and feeding element 4 are each realized by separate elements, the retaining element 5 being realized in one unit with the feeding element 4, that is, either located in a fixed fastening with the feeding element 4 or realized integrally or even monolithically. However, other examples may be implemented in accordance with this disclosure without being limited to such embodiments. Rather, the bearing element may also be realized in one unit with the retaining element (for example, fastened to the bearing element, as in the embodiment of the prior art in FIG. 8A, or realized as an integral element).

Furthermore, it is possible to arrange the retaining element 5 separately from the feeding element 4. In order to adapt or align the elements in dependence of different bar cross-sections it is merely required for the mode of operation of the first embodiment that the feeding element or a receiving portion of the feeding means be movable in order to align or center the bar coaxially with the feeding position for feeding to the machine tool.

In some example embodiments comprising a retaining element 5 that is arranged separately from the feeding element 4, it is further possible to provide modified embodiments of disclosed examples in which the transport element 3 does not only perform an upward movement and a subsequent downward movement. Rather, embodiments are possible in which additionally a lateral displacement of the transport element is comprised in the transport of the bar from the starting position to the end position. A plurality of upward and downward movements following upon one another, optionally in combination with a plurality of lateral transport movements, is also possible.

In example embodiments including an additional lateral transport movement of the transport means and the transport element 3, respectively, it is particularly possible to combine the lateral displacement of the transport element 3 with an upward and/or downward movement, e.g., by obliquely moving the transport element 3 up or down, in some preferred example embodiments in a combined circular movement in which the upward movement continuously merges with the downward movement through a circular movement.

Furthermore, it is possible that in embodiments in which a retaining element 5 is provided in combination with a feeding element 4, that is, in one piece or at least in contact with each other, the upwardly inclined guiding portion 51 and the downwardly inclined guiding portion 41d directly pass into one another or are combined with one another by a further portion (see, e.g. the short flattened portion between the upwardly inclined guiding portion 51 and the downwardly inclined guiding portion 41d in FIGS. 1A to 1E).

Figure 8A:
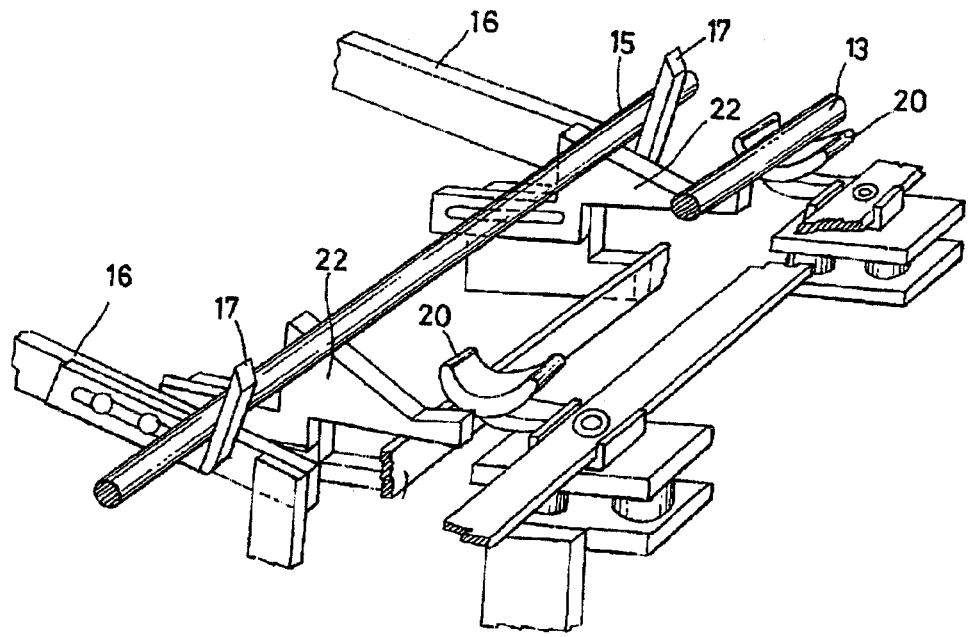
FIG. 8A shows a perspective view of a loading device according to the prior art.
Figure 8B:
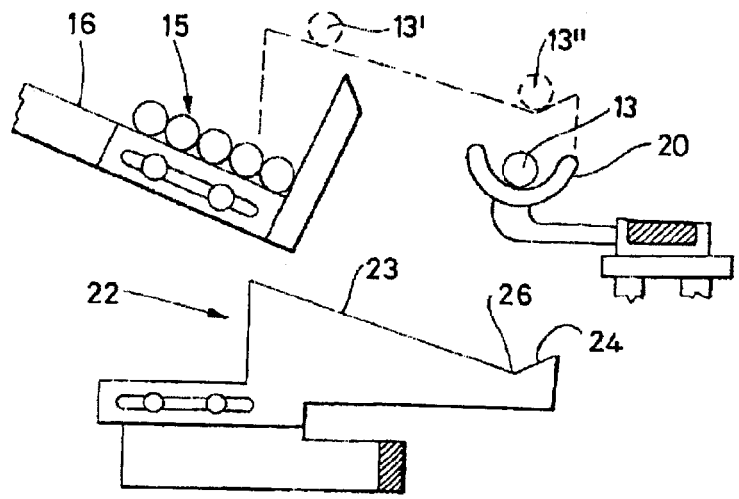
FIG. 8B shows a schematic lateral view of the elements of a loading device of FIG. 48 that are relevant for the loading process.

As can further be seen by means of FIG. 8A, it is typical according to the prior art to provide each of the elements, i.e.

the bearing element 2, the transport element 3, the retaining element 5 and the feeding element 4, at least in duplicate, the elements being arranged in an axial direction one behind the other or particularly in parallel to one another, in order to respectively provide the bar at each point in time of the loading cycle with at least two rest surfaces or two rest points.

In this case, it is possible, for example, to provide embodiments based on examples disclosed herein in which similar to FIG. 8A two or more outer bearing elements 2 are provided between which two or more transport elements 3 are located, between which two or more feeding elements 4 are disposed. However, it is also possible to provide an alternating arrangement of the respective elements one behind the other in any order in an axial direction. Particularly, it is possible to provide one of the elements of the group consisting of the bearing element 2, the transport element 3, the retaining element 5 and the feeding element 4 only once, optionally in an embodiment widened in an axial direction in order to offer the bar a broad rest surface, wherein the remaining elements are arranged in a multiple implementation outside of the element that is provided only once.

Furthermore, example embodiments are possible in which the support portions 31a and 31b are provided on separate planes. Particularly, it is to be noted that the mode of operation of the loading cycle according to the embodiment of FIG. 1A to FIG. 1E is explained by means of a lateral profile view so that elements and portions of FIG. 1A to FIG. 1E may be displaced arbitrarily in relation to one another in an axial direction as long as the lateral profile view is not changed. For example, the retaining element 5 and the feeding element 4 may be provided at an axial position, e.g., as an integrally realized element, or displaced relative to one another in an axial direction so that the lateral view, that is, the view from an axial direction, is not changed. The same applies to the transport element 3 which may optionally be formed from two elements displaced in an axial direction, each of these elements respectively having the portion 31a or the portion 31b, wherein said two elements are displaced in an axial direction without changing the lateral profile view from an axial direction.

Figure 4:
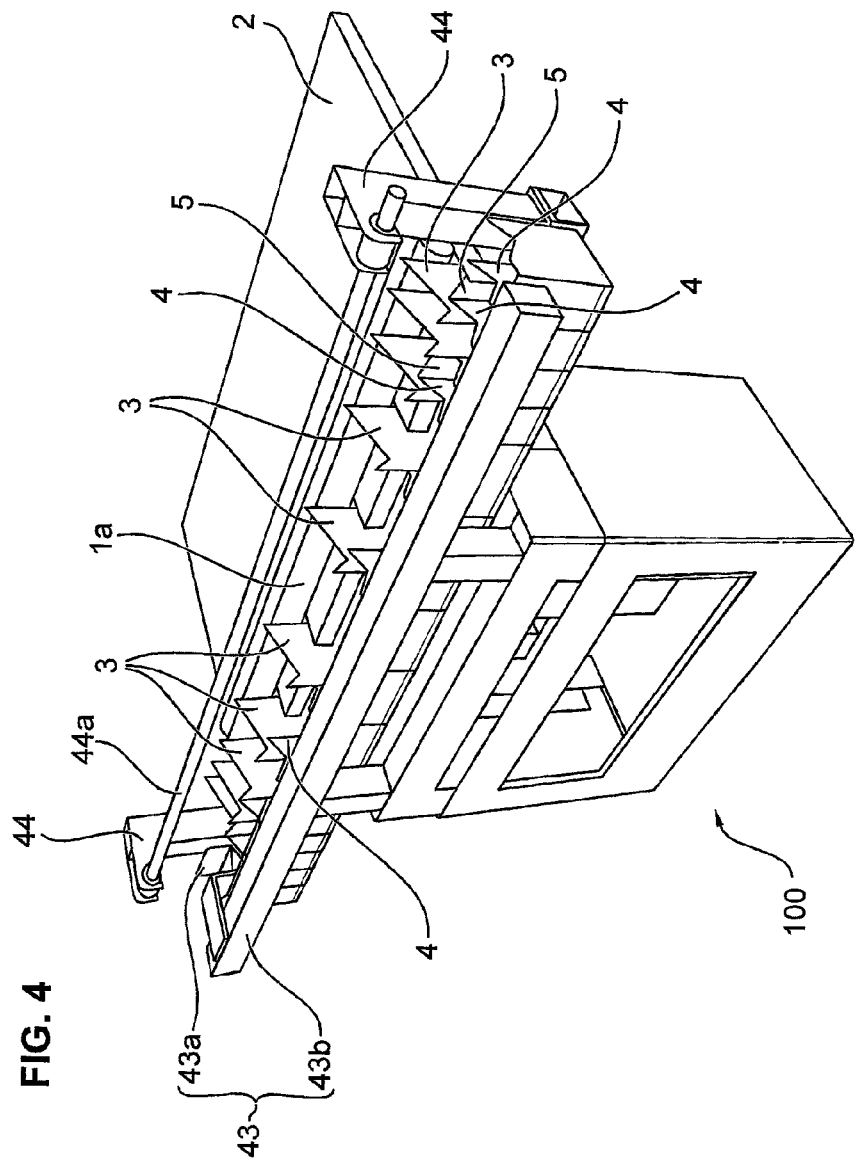
FIG. 4 shows a schematic perspective view of a loading device according to an example embodiment.

FIG. 4 shows a schematic perspective view of an example loading device 100 according to an example embodiment. In this case, the loading device 100 is suitable to transport a bar 1a according to the above-described example embodiments from a starting position on a bearing element 2 (here an inclined plane as an example) to an end position. The loading device 100 comprises transport means having a plurality of transport elements 3, feeding means having a plurality of feeding elements 4 and a plurality of retaining elements 5. Some elements of the plurality of feeding elements are realized in one unit with a respective one of the retaining elements 5. The transport elements 3 and the feeding elements 4 are alternately arranged in an axial direction, i.e., in the feeding direction to a machine tool. As an example, more transport elements 3 and feeding elements 4 are disposed at the sides than in the center, as can be taken from FIG. 4. This enables higher flexibility with regard to the length of the bar to be landed. The axial lateral view of the elements 3, 4, and 5 corresponds to the arrangement of FIGS. 1A to 1E.

The feeding means of the loading device 100 further comprises axial feeding means 43 (also referred to as e.g. a shuttle means) including a support portion 43a (also referred to as, e.g., a shuttle). The axial feeding means 43 is adapted to move the support portion 43a in an axial direction along an axial feeding guiding portion 43b in order to displace a bar held in the end position on the feeding elements 4 in an axial direction to feed the bar from the end position to a machine tool.

Moreover, the feeding means comprises a pushing means 44 (also referred to as, e.g., a pusher) including a pushing rod 44a displaceably held in the pushing means 44 in an axial direction. The pushing means 44 is adapted to align the pushing rod 44a in the end position with a feeding position (for example, by upward and downward displacements). The mechanism of the axial feeding of a bar from the end position to the machine tool will be explained below.

Figure 5:
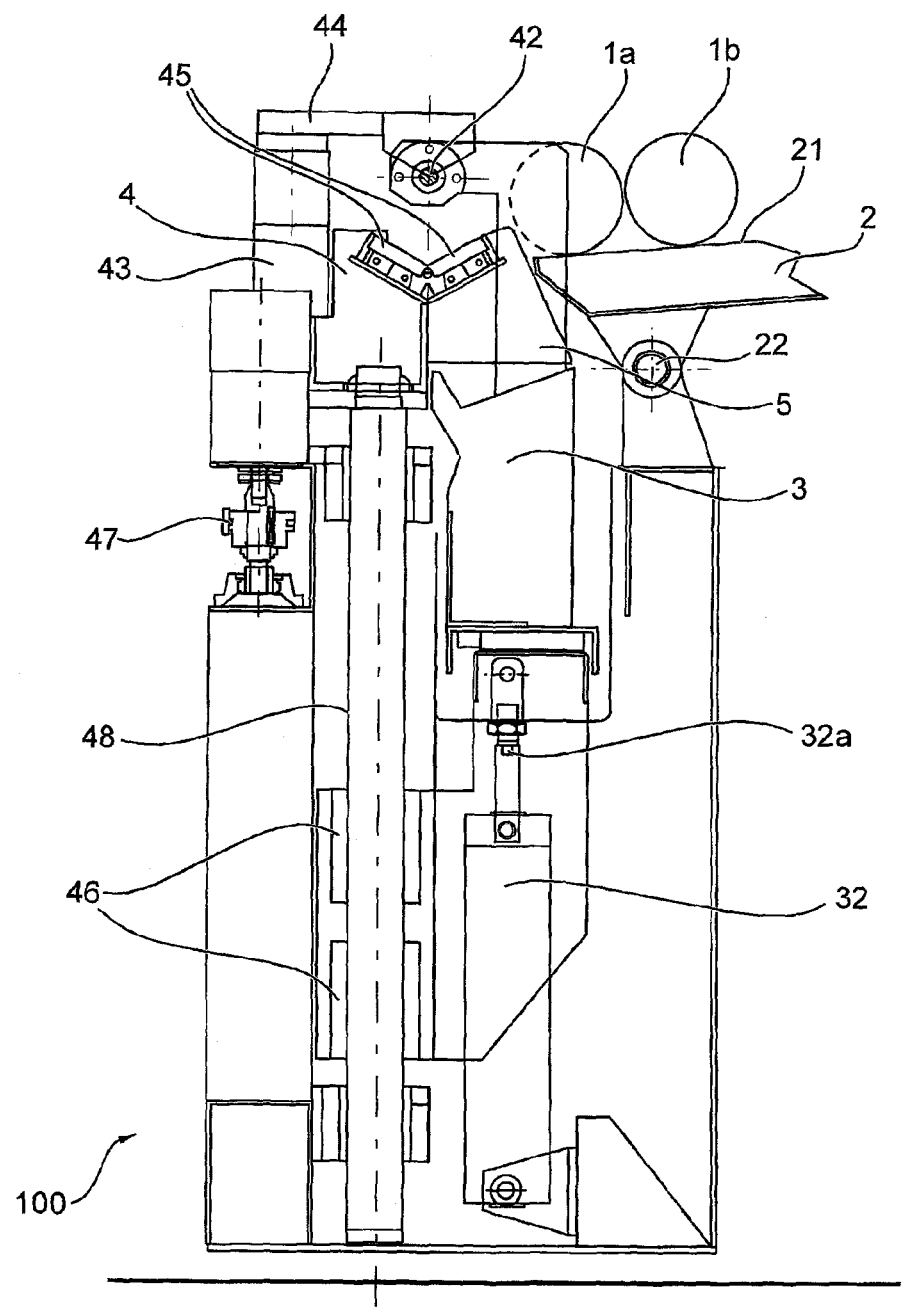
FIG. 5 shows a schematic lateral view of the loading device of FIG. 4.

FIG. 5 shows a schematic lateral view of the loading device 100 of FIG. 4 in an axial direction, Here, it can particularly be seen that the axial lateral view of the elements 3, 4, and 5 corresponds to the arrangement of FIGS. 1A to 1E. The loading device 100 further comprises a tilting bearing 22 for tilting the bearing element 2 of the rest surface 21 of the bearing element 2. The tilting may be made manually or automatically. Moreover, FIG. 5 shows a pneumatic cylinder 32 to which a transport element 3 is attached by using a fastening means 32a and with which cylinder the transport element can be moved up and down in order to be able to carry out an example loading cycle according to FIGS. 1A to 1E.

The feeding means further comprises alignment means 47 adapted to move an alignment element 48 up and down. Here, at least one feeding element 4 is fixed to the alignment element 48. In this case, the alignment element 48 is held in two ball sleeve bearings 46, in the illustrated example. Using the alignment means 47, it is possible to align the end position 42 on the feeding element in dependence of a bar diameter and a bar cross-section, respectively, with the axial feeding position for feeding a bar to the machine tool (see also FIGS. 2 to 3B and the associated description). Here, the alignment can be performed by operating the alignment means 47 manually or automatically.

Furthermore, in some examples such as shown in FIG. 5, at least one of the feeding elements 3 can comprise bearing rollers 45 (which form at least a part of the inclined portions 41a and 41b of FIGS. 1A to 1E) in order to facilitate the axial feeding of the bar to the machine tool.

Figure 6:
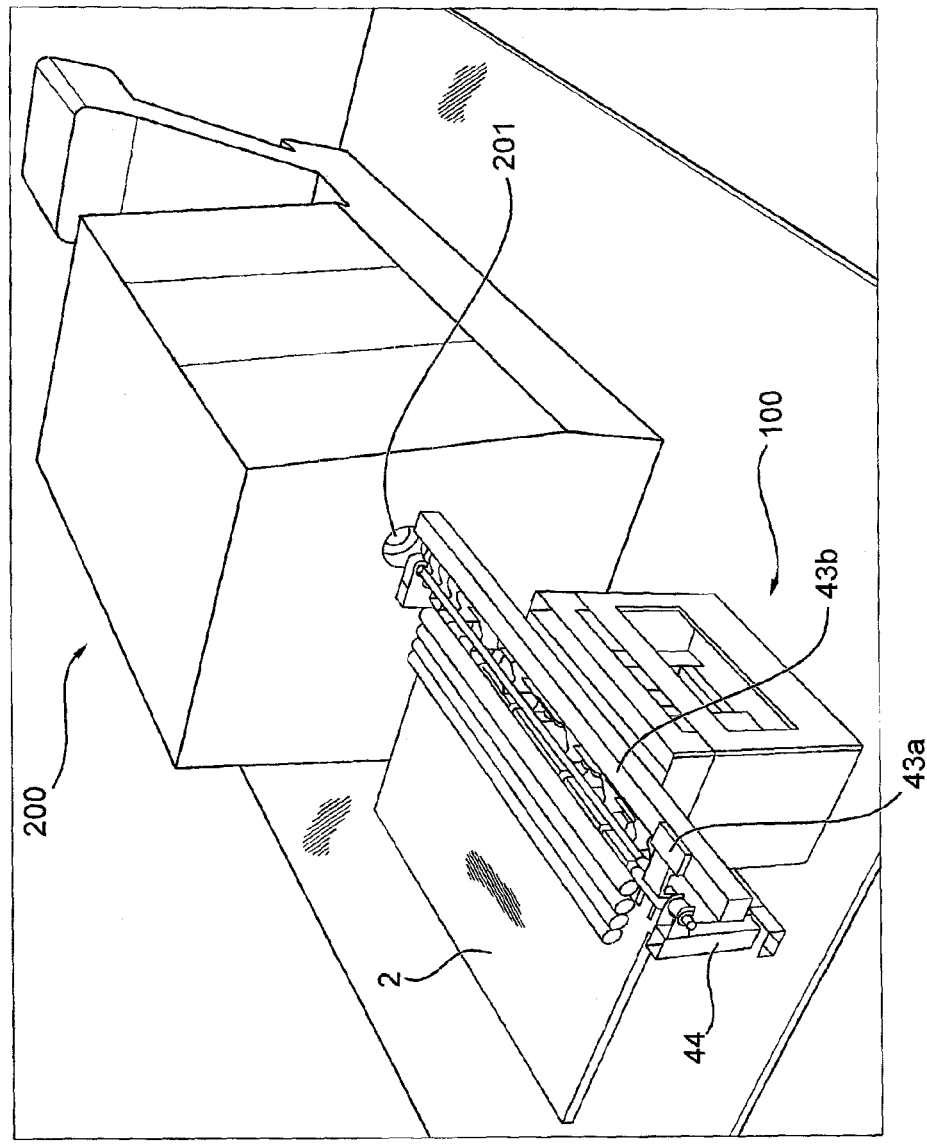
FIG. 6 shows a system comprising a machine tool for machining a bar and the loading device of FIG. 4.

FIG. 6 shows a system comprising an example machine tool 200 for machining a bar and an example loading device 100 of FIG. 4. In the illustrated example of FIG. 6, the machine tool comprises an opening 201 through which a bar may be fed in an axial direction from an end position aligned with the feeding position to the machine tool 200 for machining the bar. The machine tool 200 may, e.g., be a turning lathe wherein the bar is fed in an axial direction to the spindle of the turning lathe.

FIGS. 7A to 7H show an example loading cycle of a bar 1a from the end position on the feeding elements 3, when the end position is aligned in dependence of the bar cross-section of the bar 1a with the feeding position, to the machine tool 200 in FIG. 6 by feeding the bar from the end position to the machine tool in an axial direction.

Figure 7A:
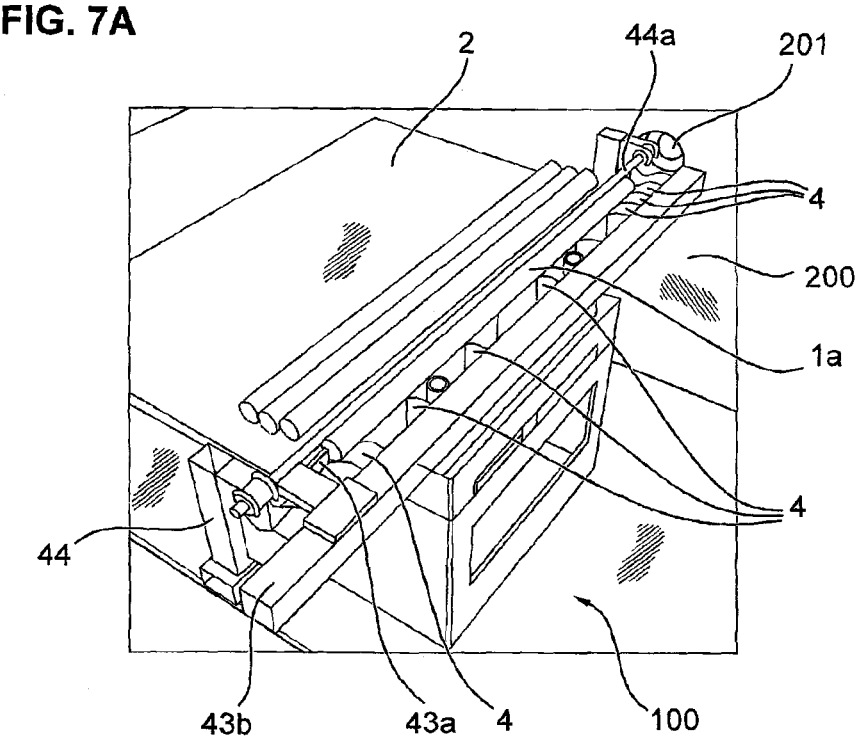

FIG. 7A shows the loading device 100 in a condition that corresponds to the situation of FIG. 1E. The bar 1a is held in receiving portions 41a, 41b on the feeding elements in an end position (e.g., the end position 42 of FIGS. 1A-1E) after the transport of the bar 1a to the end position as described above in connection with FIGS. 1A-1E, the end position being aligned in dependence of the bar diameter of the bar 1a with the feeding position in which the bar 1a is to be fed to the machine tool 200 in an axial direction through the opening 201.

Figure 7B:
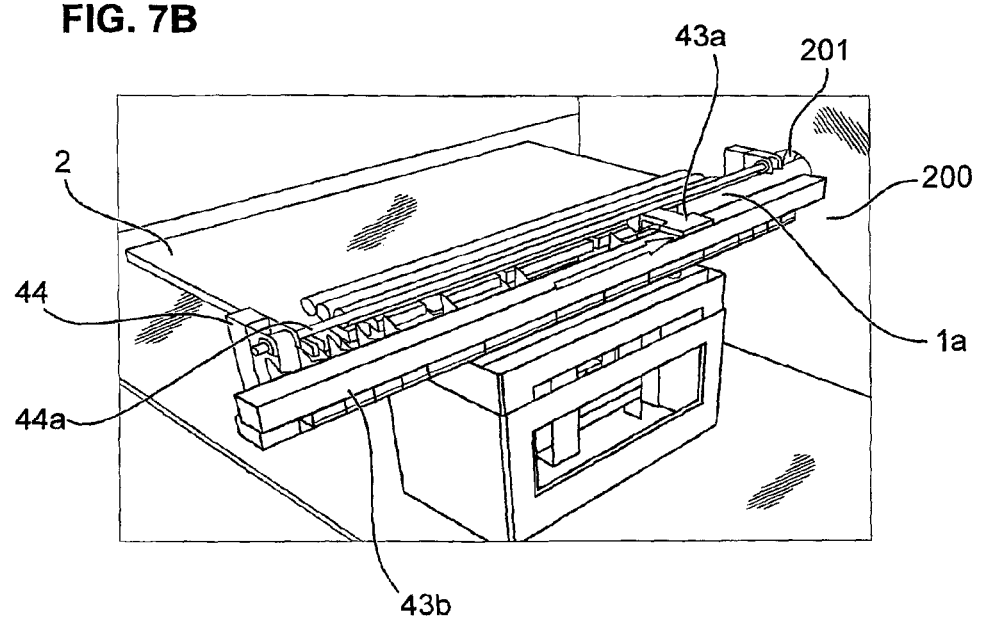

FIG. 7B shows an example manner of how the bar 1a is fed to the machine tool 200 through the opening 201 by displacing the support portion 43a (that is, e.g., a shuttle 43a) along the guiding portion 43b of the axial feeding means 43 in an axial direction (see arrow in FIG. 7B).

FIG. 7C shows the loading device 100 in a condition in which the support portion 43a is displaced up to nearly the one end of the guiding portion 43b and the bar 1a is pushed almost completely into the opening 201 of the machine tool 200. Following this, the support portion is displaced again along the guiding portion 43b in the opposite direction. Subsequently, the pushing rod 44a of the pushing means 44 is aligned in the feeding position by a downward displacement, that is, coaxially or substantially coaxially with the bar 1a (see FIGS. 7D and 7E; FIG. 7E showing details from the dashed portion in FIG. 7D).

Figure 7F:
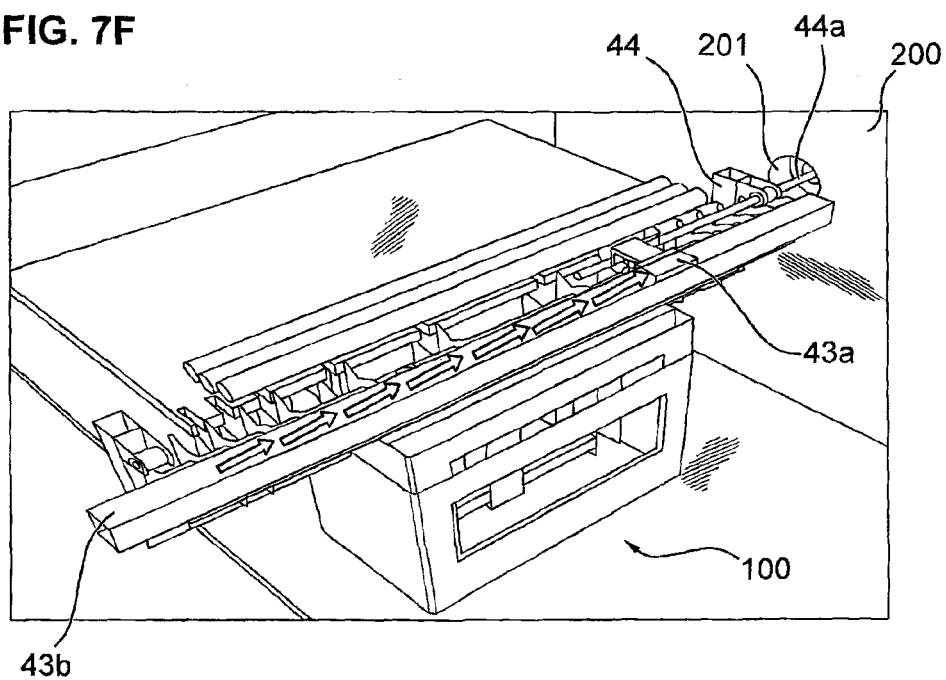
Figure 7G:
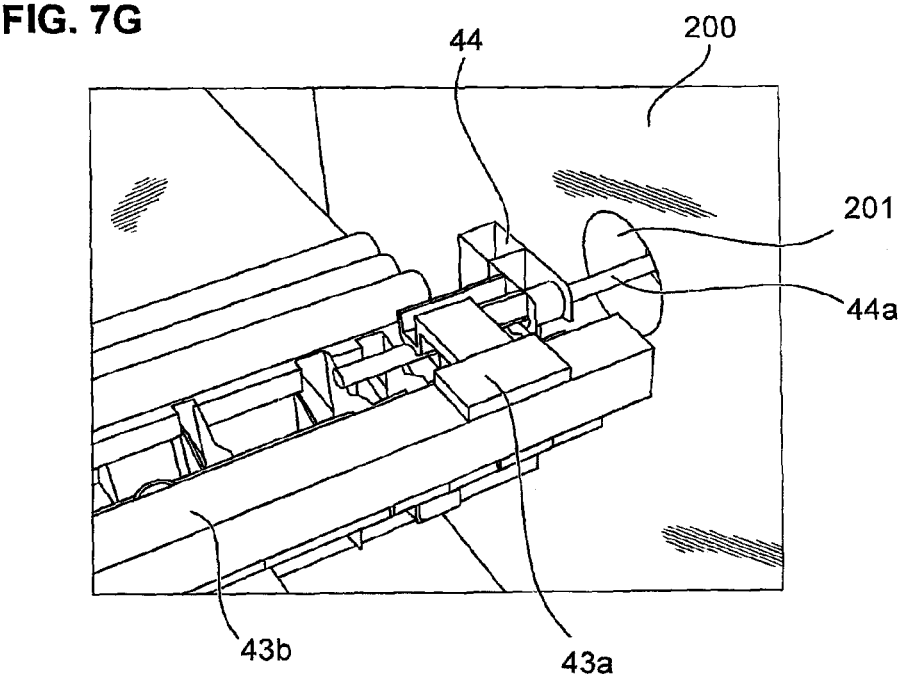

As shown in FIG. 7F the support portion 43a is subsequently displaced again in an axial direction along the guiding portion 43b towards the machine tool 200, the pushing rod 44a being pushed into the opening 201 of the machine tool 200, pushing the bar 1a further into the machine tool 200 in order to feed the bar 1a up to a spindle of the machine tool so that the machine 1a can be machined on the machine tool 200 (see also FIG. 7G).

Figure 7H:
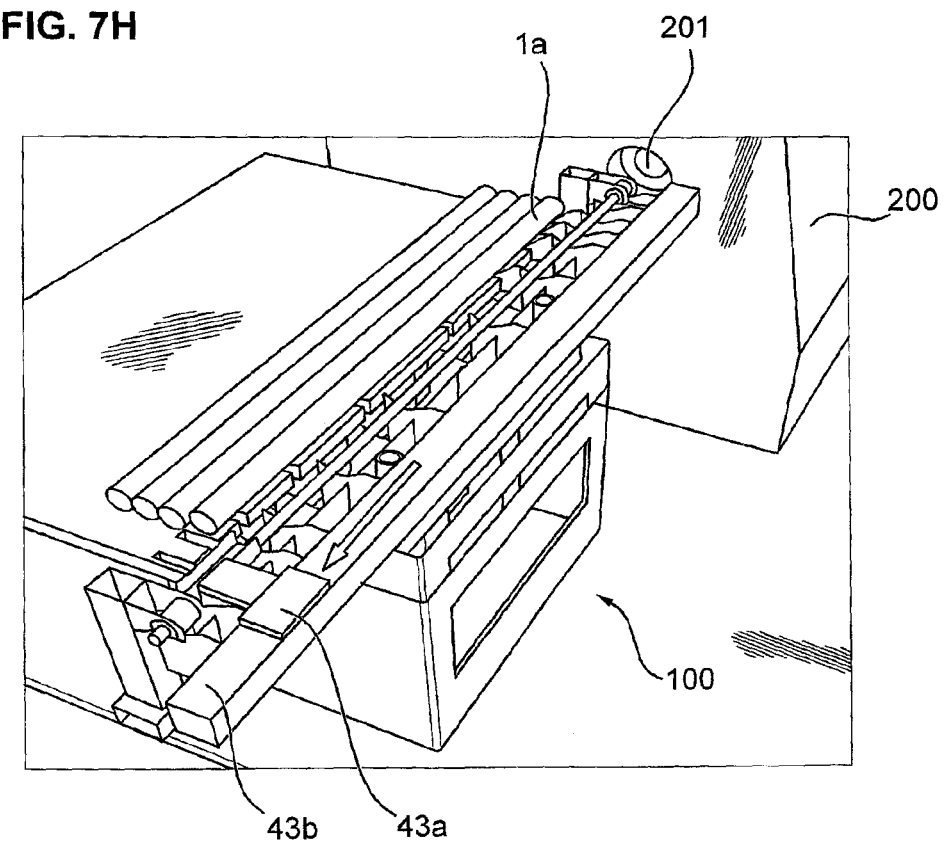

When the support portion 43a is displaced again in an opposite direction along the guiding portion 43b, the pushing rod 44a being removed from the machine tool 200, and after the pushing means 44 has displaced the pushing rod 44a again into the starting position thereof (opposite to the direction of FIG. 7D), the loading device 100 is back in a condition as shown in FIG. 7H which still corresponds to a condition according to FIG. 1A. Thus, it is possible to again transport a bar 1a supported on the bearing element 2 by means of the transport elements 3 to the end position on the feeding elements 4 (see e.g. FIGS. 1A to 1E).

All above-described example embodiments have in common that the loading device for loading bars for machining in a machine tool is adapted to transport a bar from a starting position to an end position and to feed the bar from the end position to the machine tool. The loading device comprises a support portion for supplying the loading device with at least one bar positioned in the starting position on the rest portion, and moveable transport means for transporting the bar from the starting position to the end position. The transport means is adapted to transport the bar downward due to its gravity in a downward movement along a downwardly inclined guiding portion, the bar being supported by a first support portion of the transport means.

In summary, examples disclosed herein provide a loading device for loading bars for machining on a machine tool, which can avoid the disadvantages of the prior art and particularly enable a fast and efficient loading cycle that can be carried out in a particularly low-impact manner and free of collisions, respectively. Furthermore, examples disclosed herein make it possible in a particularly advantageous manner to adapt the disclosed example loading devices to different bar cross-sections of the bars to be landed. It is not required to laboriously adjust an angle of inclination of retaining elements or retaining fingers by means of a complicated mechanism.

Although certain methods, apparatus, systems, and articles of manufacture have been described herein, the scope of coverage of this patent is not limited thereto. To the contrary, this patent covers all methods, apparatus, systems, and articles of manufacture fairly falling within the scope of the appended claims either literally or under the doctrine of equivalents.

What is claimed is:

1. A loading device for loading bars for machining in a machine tool, the loading device being adapted to move a bar from a starting position to an end position and to feed the bar from the end position to the machine tool, the loading device comprising:
    a rest portion for supplying the loading device with at least one bar supported on the rest portion in the starting position;
    a movable transport comprising a transport member including a first angular portion, wherein a first leg of an angle of the first angular portion forms a first support portion and a second leg of the angle of the first angular portion forms a second support portion, the transport being moveable vertically upward and vertically downward; and
    a feeder adapted to feed the bar from the end position to the machine tool, the feeder comprising a feeding element including a receiving portion in which the bar lies in the end position, wherein the feeding element comprises a second angular portion, one leg of the angle of the second angular portion forming a downwardly inclined guiding portion,
    the movable transport being adapted to lift the bar from the starting position on the rest portion in an upward movement with respect to the rest portion and to push the bar upward with respect to the rest portion along an upwardly inclined guiding portion to a topmost position with respect to the rest portion while the bar is supported by the second support portion of the transport member during the upward movement with respect to the rest portion between the starting position and the topmost position,
    wherein, during the transporting from the starting position to the end position, the bar is supported in the topmost position, which is reached between the upward movement along the upwardly inclined guiding portion and a downward movement with respect to the topmost position along the downwardly inclined guiding portion, by both of the first and the second support portions of the transport member, and
    wherein the movable transport is further adapted to transport the bar from the topmost position to the end position, the transport being adapted to transport the bar downward in the downward movement with respect to the topmost position due to its gravity along the downwardly inclined guiding portion to the end position while the bar is supported by the first support portion of the transport during the downward movement with respect to the topmost position between the topmost position and the end position.

2. The loading device of claim 1, wherein the rest portion is a downwardly inclined rest portion on which the bar lying in the starting position is retained against gravity by a retaining element.

3. The loading device of claim 2, wherein the retaining element comprises the upwardly inclined guiding portion.

4. The loading device of claim 1, wherein the feeder is adapted to align the end position of the bar with a feeding position from which the bar is to be fed to the machine tool.

5. The loading device of claim 4, wherein the feeding element is moveable vertically upward and vertically downward to align the end position of the bar.

6. The loading device of claim 1, wherein the bar has a circular cross-section or a hexagonal cross-section.

7. A system comprising a machine tool for machining a bar, and the loading device as defined in claim 1.

8. A loading device for loading bars for machining in a machine tool, the loading device being adapted to move a bar from a starting position to an end position and to feed the bar from the end position to the machine tool, the loading device comprising:
  a rest portion for supplying the loading device with at least one bar supported on the rest portion in the starting position;
  a movable transport comprising a transport member including a first angular portion, wherein a first leg of an angle of the first angular portion forms a first support portion and a second leg of the angle of the first angular portion forms a second support portion, wherein an upper end of the first support portion terminates in a vertical plane that is common with a rest position, wherein during downward movement the bar is supported by the movable transport until the bar reaches the rest position; and
  a feeder adapted to feed the bar from the end position to the machine tool, the feeder comprising a feeding element including a receiving portion in which the bar lies in the end position, wherein the feeding element comprises a second angular portion, one leg of the angle of the second angular portion forming a downwardly inclined guiding portion,
  the movable transport being adapted to lift the bar from the starting position on the rest portion in an upward movement with respect to the rest portion and to push the bar upward with respect to the rest portion along an upwardly inclined guiding portion to a topmost position with respect to the rest portion while the bar is supported by the second support portion of the transport member during the upward movement with respect to the rest portion between the starting position and the topmost position,
  wherein, during the transporting from the starting position to the end position, the bar is supported in the topmost position, which is reached between the upward movement along the upwardly inclined guiding portion and a downward movement with respect to the topmost position along the downwardly inclined guiding portion, by both of the first and the second support portions of the transport member, and
  wherein the movable transport is further adapted to transport the bar from the topmost position to the end position, the transport being adapted to transport the bar downward in the downward movement with respect to the topmost position due to its gravity along the downwardly inclined guiding portion to the end position while the bar is supported by the first support portion of the transport during the downward movement with respect to the topmost position between the topmost position and the end position.

9. A system comprising a machine tool for machining a bar, and the loading device as defined in claim 8.

* * * * *